United States Patent
Roberts

(10) Patent No.: US 7,481,930 B2
(45) Date of Patent: Jan. 27, 2009

(54) FILTER HAVING A FILTER LAYER THAT FORMS A PROTECTIVE BARRIER TO PREVENT CLOGGING OF A GRAVEL-LESS UNDERDRAIN AND METHOD OF MAKING THE SAME

(75) Inventor: R. Lee Roberts, Chadds Ford, PA (US)

(73) Assignee: RG Delaware, Inc., Wilmington, DE (US)

( * ) Notice: Subject to any disclaimer, the term of this patent is extended or adjusted under 35 U.S.C. 154(b) by 579 days.

(21) Appl. No.: 11/191,944

(22) Filed: Jul. 29, 2005

(65) Prior Publication Data
US 2007/0023346 A1 Feb. 1, 2007

(51) Int. Cl.
*B01D 24/1221* (2006.01)
(52) U.S. Cl. .................. 210/293; 210/108; 210/273
(58) Field of Classification Search .......... 210/293, 210/108, 715, 748, 739
See application file for complete search history.

(56) References Cited

U.S. PATENT DOCUMENTS

| | | | |
|---|---|---|---|
| 3,335,868 A | 8/1967 | Schiffers | |
| 3,343,680 A * | 9/1967 | Rice et al. | 210/263 |
| 3,623,978 A | 11/1971 | Boze et al. | |
| 3,680,701 A | 8/1972 | Holca | |
| 4,051,039 A | 9/1977 | Heaney | |
| 4,479,880 A | 10/1984 | Treanor | |
| 4,547,286 A | 10/1985 | Hsiung | |
| 4,604,197 A | 8/1986 | Louboutin et al. | |
| 4,608,181 A | 8/1986 | Hsiung et al. | |
| 4,668,405 A | 5/1987 | Boze | |
| 4,707,257 A | 11/1987 | Davis et al. | |
| 4,793,934 A * | 12/1988 | Thompson et al. | 210/715 |
| 5,080,808 A | 1/1992 | Kim et al. | |
| 5,087,354 A * | 2/1992 | Montagnon et al. | 210/108 |
| 5,167,840 A | 12/1992 | Jaccarino | |
| 5,198,124 A | 3/1993 | Kim et al. | |
| 5,314,630 A | 5/1994 | Kim et al. | |

* cited by examiner

*Primary Examiner*—Walter D Griffin
*Assistant Examiner*—Cameron J Allen
(74) *Attorney, Agent, or Firm*—Merek, Blackmon & Voorhees, LLC

(57) ABSTRACT

A filter having a gravel-less underdrain and a filter layer installed directly on top of the gravel-less underdrain. The filter layer is designed such that when fluid is directed through the filter layer at controlled rates a protective barrier is formed by the larger particles of the filter layer directly above the gravel-less underdrain to prevent clogging and/or structural failure of the gravel-less underdrain thereby obviating the need for one or more layers of gravel or torpedo sand.

21 Claims, 5 Drawing Sheets

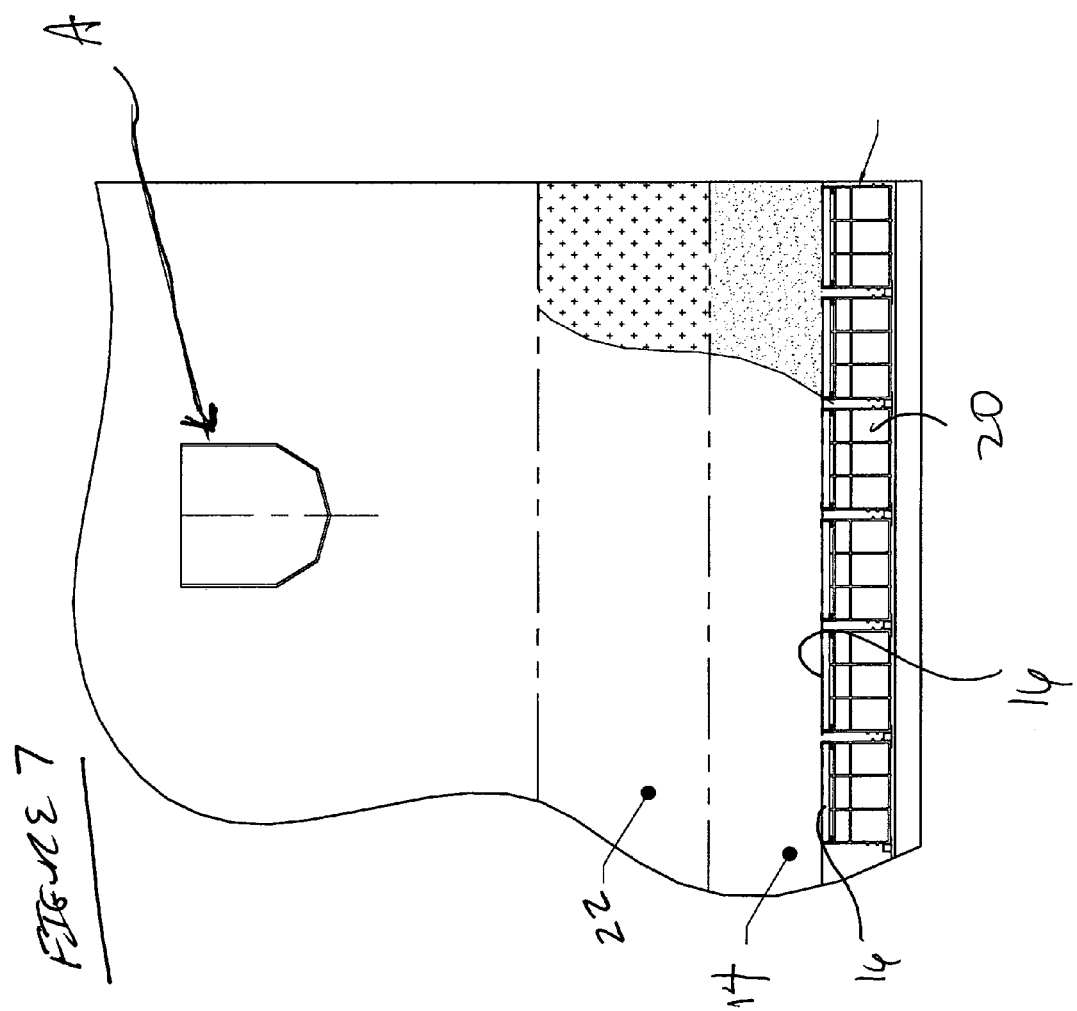

FILTER HAVING A FILTER LAYER THAT FORMS A PROTECTIVE BARRIER TO PREVENT CLOGGING OF A GRAVEL-LESS UNDERDRAIN AND METHOD OF MAKING THE SAME

FIELD OF THE INVENTION

The present invention is directed to a filter having a gravel-less underdrain and a filter layer installed directly above the gravel-less underdrain that forms a protective barrier to prevent clogging of the gravel-less underdrain. The present invention is also directed to a method of forming a filter layer that provides a protective barrier directly adjacent the gravel-less underdrain to prevent clogging. The present invention is further directed to a method of forming a filter having a gravel-less underdrain and a filter layer installed directly above the gravel-less underdrain that provides a protective barrier to prevent clogging of the underdrain.

BACKGROUND OF THE INVENTION

A variety of systems have been developed for filtering water and/or wastewater. Typical filter systems include but are not limited to an upflow filter, a downflow filter, a combined upflow filter and downflow filter and multiple downflow filters connected in series. The term upflow filter is given to a filter in which the liquid or influent to be filtered is directed in an upward path to remove impurities. Conversely, a downflow filter is a filter in which the influent is directed in a downward path to remove impurities.

In a combined upflow/downflow filter system, influent is directed upwardly through the upflow filter to remove a predetermined percentage of the impurities in the influent and then the influent is directed downwardly through the downflow filter to remove the remaining impurities to within an acceptable level. The upflow filter, in this combined system, is referred to as a roughing filter or clarifier. The downflow filter, in this combined system, is referred to as a polishing filter. One noticeable difference between a roughing filter and a polishing filter is the size of the filter media. The filter media in the polishing filter is considerably smaller than the filter media in the roughing filter.

The most common methodology utilized to specify the size of media in the filtration industry is through effective size and uniformity coefficient. The American Water Works Association (AWWA) B100 standard defines effective size (also known as d10) as "the size of opening that will just pass 10 percent (by dry weight) of a representative sample of filter material; that is, if the size distribution of particles is such that 10 percent (by dry weight) of a sample is finer than 0.45 mm, the filter material has an effective size of 0.45 mm." As used herein "effective size" has the same meaning as the AWWA B100 standard.

The AWWA B100 standard defines uniformity coefficient as "a ratio calculated as the size opening that will just pass 60 percent (by dry weight) of a representative sample of the filter material divided by the size opening that will just pass 10 percent (by dry weight) of the same sample." As used herein "uniformity coefficient" has the same meaning as the AWWA B100 standard.

A typical specification for filter sand used in a polishing filter is an effective size ranging from 0.45 mm to 0.55 mm with a uniformity coefficient of less than 1.7. The effective size of the filter sand used in a roughing filter is considerably larger and can have an effective size well in excess of 1.0 mm. The smaller particles in the filter sand used in polishing filters can lead to clogging of the underdrain. For example, one common type of underdrain includes a plurality of underdrain blocks arranged in parallel rows across the bottom of the filter. The underdrain blocks act to direct and receive fluids including influent, effluent and air during operation of the filter system. The underdrain blocks typically include multiple apertures through which the fluids are directed and received. The apertures are typically larger than the smaller particles of the filter sand used in polishing filters. Accordingly, it has been necessary to employ some means to prevent clogging and/or structural failure of the underdrain.

One or more gravel support layers have been used between the filter sand and the underdrain to prevent clogging. Referring to FIG. 1, a prior art filter is depicted using a gravel support layer 2 between the underdrain blocks 4 and the filter sand 6 to prevent clogging of the underdrain blocks 4. The gravel in the support layer 2 is larger than the apertures in the underdrain blocks and, therefore, does not pass there through. The smaller particles of the filter sand will embed in the support gravel rather than pass through or obstruct the apertures in the underdrain blocks. However, gravel support layers have a number of disadvantages. Specifically, gravel support layers are expensive and time consuming to install. Further, gravel support layers consume a significant portion of the filter chamber thus reducing the filtering capacity of the bed. Also, gravel support layers are subject to being upset when uncontrolled air enters the filter bed due to installation of the air system or operator error. Moreover, in filter beds using granular activated carbon such must occasionally be removed from the filter and placed in a reactivation furnace. During removal of the granular activated carbon, the gravel becomes intermixed and is deposited in the reactivation furnace. At the extreme temperatures necessary to reactivate the granular activated carbon the gravel can explode damaging the furnace.

To overcome the disadvantages of gravel support layers, porous plates have been used with underdrain blocks. The porous plates obviate the need for the gravel support layers because they prevent the filter media from passing through or lodging in the apertures in the underdrain blocks. Referring to FIG. 2, a prior art filter is depicted using a porous plate 8 between the underdrain blocks 10 and the filter sand layer 12. Porous plates are typically formed from sintering plastic beads such as high-density polyethylene into an open-celled structure. The porous plates typically have a thickness ranging from ¾" to 1" and have an average pore size of 300 to 700 microns.

Porous plates are typically attached to the upper surface of an underdrain block with screws, a rails system or other attachment means. In most cases, the filter sand having an effective size ranging from 0.3 mm to 0.5 mm is placed directly on top of the porous plate. The fine particles in the filter sand will nest in the pores of the porous plate and eventually pass through the porous plate. The presence of the fine filter media particles embedded in the pores of the porous plate can accelerate clogging and lead to structural failure of the plate. A two or three inch layer of torpedo sand having an effective size ranging from 0.8 mm to 1.2 mm has been used between the porous plate and the filter sand layer to prevent the fine particles from embedding in the porous plate. However, the torpedo sand suffers from problems similar to those associated with one or more gravel support layers. Further, members in the water filtration community are reluctant to add additional layers of media, substitute a layer of torpedo sand for the corresponding depth of filter media or otherwise alter the filter media specifications.

Accordingly, there is a present need for a filter that does not use either torpedo sand or gravel and yet still prevents clogging and/or structural failure of the porous plate or other gravel-less underdrain.

OBJECTS AND SUMMARY OF THE INVENTION

An object of the present invention is to provide a novel and unobvious filter and method of forming the same.

Another object of a preferred embodiment of the present invention is to provide a filter that does not need either one or more gravel support layers or torpedo sand layers to prevent clogging or structural failure of the underdrain.

Still another object of a preferred embodiment of the present invention is to provide a filter layer that will not clog or cause structural failure of a porous plate or other gravel-less underdrain while still satisfying all typical filter media specifications.

A further object of a preferred embodiment of the present invention is to provide a method of forming a filter layer that will not clog or cause structural failure of a porous plate or other gravel-less underdrain while still satisfying all typical filter media specifications.

Yet another object of a preferred embodiment of the present invention is to provide a gravel-less underdrain type filter that maximizes the filtering volume of the filter bed.

Yet still a further object of the present invention is provide a filter layer that forms a protective barrier directly adjacent the gravel-less underdrain to prevent clogging and/or structural failure of the gravel-less underdrain.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a method of forming a gravel-less polishing filter for filtering water and/or wastewater. The method comprises the steps of: (a) providing a polishing filter having a gravel-less underdrain including a porous plate, the porous plate having a plurality of openings; (b) providing a lot of filter media having an effective size less than 0.75 mm and a uniformity coefficient less than 2, the lot of filter media having a sufficient number of large particles to form a protective barrier to prevent clogging of the openings of the porous plate; (c) installing the lot of filter media in the polishing filter directly above the porous plate to form a filter layer; (d) after the step of installing, directing a fluid through the filter layer; and, (e) controlling the flow of fluid through the filter layer such that at least a portion of the larger particles in the filter layer settle directly on top of the porous plate thereby forming a protective barrier preventing smaller particles from clogging the porous plate.

Another embodiment of the present invention is directed to a method of forming a gravel-less polishing filter for filtering water and/or wastewater. The method comprises the steps of: (a) determining at least two parameters for a layer of filter media to be installed directly above a gravel-less underdrain in a polishing filter wherein one of the at least two parameters is an effective size less than 1 mm and the other of the at least two parameters is a uniformity coefficient less than 2; (b) providing a first lot of filter media satisfying the at least two parameters for the layer of filter media to be installed directly above a gravel-less underdrain; (c) providing a second lot of media that does not satisfy at least one of the at least two parameters for the layer of filter media to be installed directly above a gravel-less underdrain; and, (d) blending at least a portion of the first lot of filter media with at least a portion of the second lot of media to form a third lot of media that satisfies both of the at least two parameters for the layer of filter media to be installed directly above a gravel-less underdrain.

A further embodiment of the present invention is directed to a method of forming a filter layer for a gravel-less polishing filter for filtering water and/or wastewater. The method comprises the steps of: (a) determining at least two parameters for a layer of filter media to be installed directly above a gravel-less underdrain in a polishing filter wherein one of the at least two parameters is an effective size less than 1 mm and the other of the at least two parameters is a uniformity coefficient less than 2; (b) providing a first lot of filter media satisfying the at least two parameters for the layer of filter media to be installed directly above a gravel-less underdrain; (c) providing a second lot of media that has an effective size at least twice as large as an effective size of the first lot of filter media; and, (d) blending at least a portion of the first lot of filter media with at least a portion of the second lot of media to form a third lot of media that satisfies both the at least two parameters for the layer of filter media to be installed directly above a gravel-less underdrain.

Still another embodiment of the present invention is directed to a method of forming a gravel-less polishing filter for filtering water and/or wastewater. The method comprises the steps of: (a) determining at least two parameters for a layer of filter media to be installed directly above a gravel-less underdrain in a polishing filter wherein one of the at least two parameters is an effective size less than 1 mm and the other of the at least two parameters is a uniformity coefficient less than 2; (b) providing a first lot of filter media satisfying the at least two parameters for the layer of filter media to be installed directly above a gravel-less underdrain; (c) providing a second lot of media that has an effective size at least twice as large as the effective size of the first lot of filter media; and, (d) blending at least a portion of the first lot of filter media with at least a portion of the second lot of media to form a third lot of media that satisfies both the at least two parameters for the layer of filter media to be installed directly above a gravel-less underdrain; (e) providing a polishing filter having a gravel-less underdrain including a porous plate; (f) after the blending step, installing the third lot of media in the polishing filter directly above the porous plate to form a filter layer.

BRIEF DESCRIPTION OF THE DRAWINGS

FIG. 7 illustrates a polishing filter having a filter layer formed from the blended media having a sieve analysis curve as illustrated in FIG. 6.

DETAILED DESCRIPTION OF THE PREFERRED EMBODIMENTS OF THE INVENTION

The preferred forms of the invention will now be described with reference to FIGS. 3-7. The appended claims are not limited to the preferred forms and no term and/or phrase used herein is to be given a meaning other than its ordinary meaning unless it is expressly stated that the term and/or phrase shall have a special meaning.

FIGS. 3 Through 7

Figure 1:
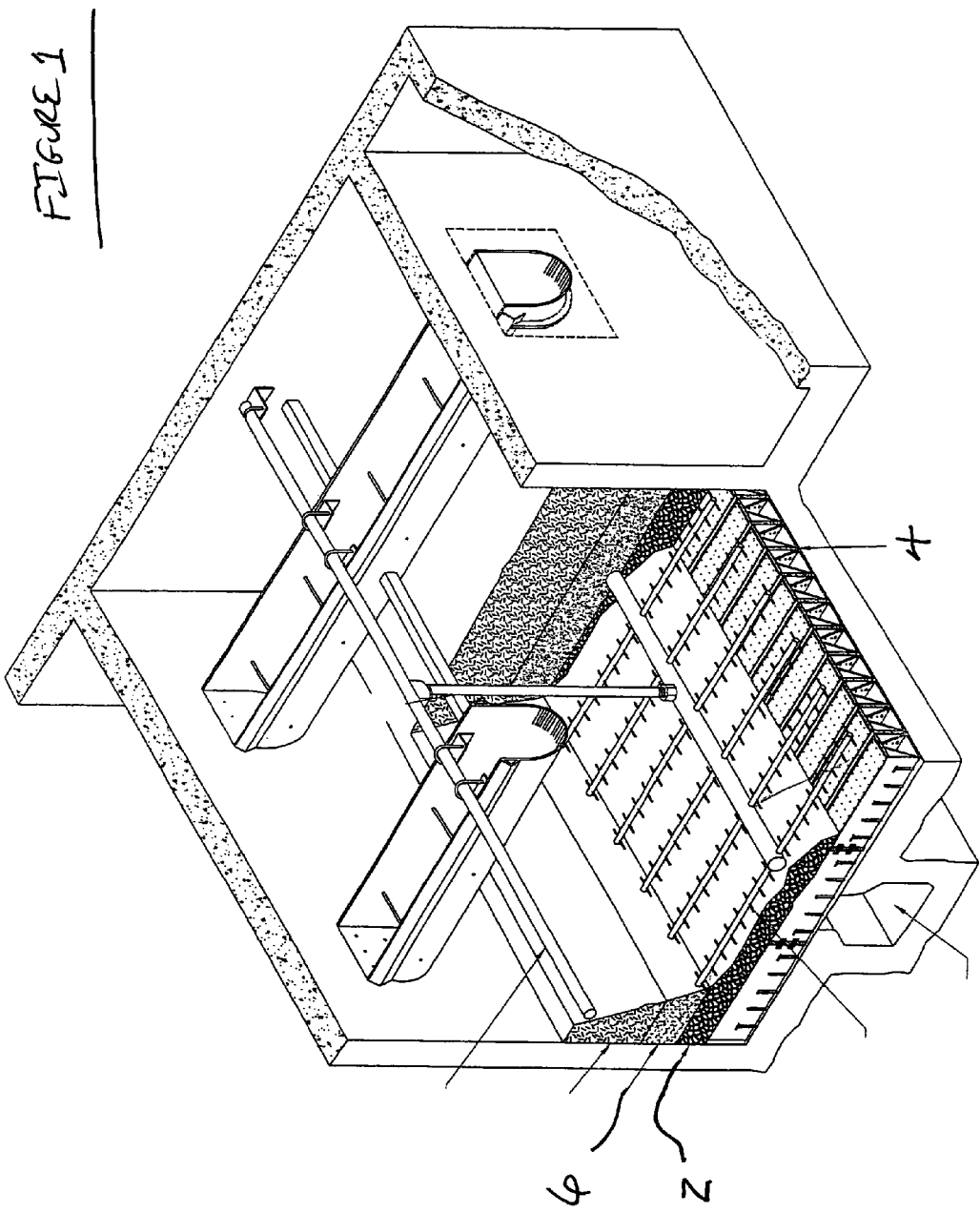
FIG. 1 illustrates a prior art filter using a gravel support layer between the layer of filter sand and the underdrain blocks.
Figure 2:
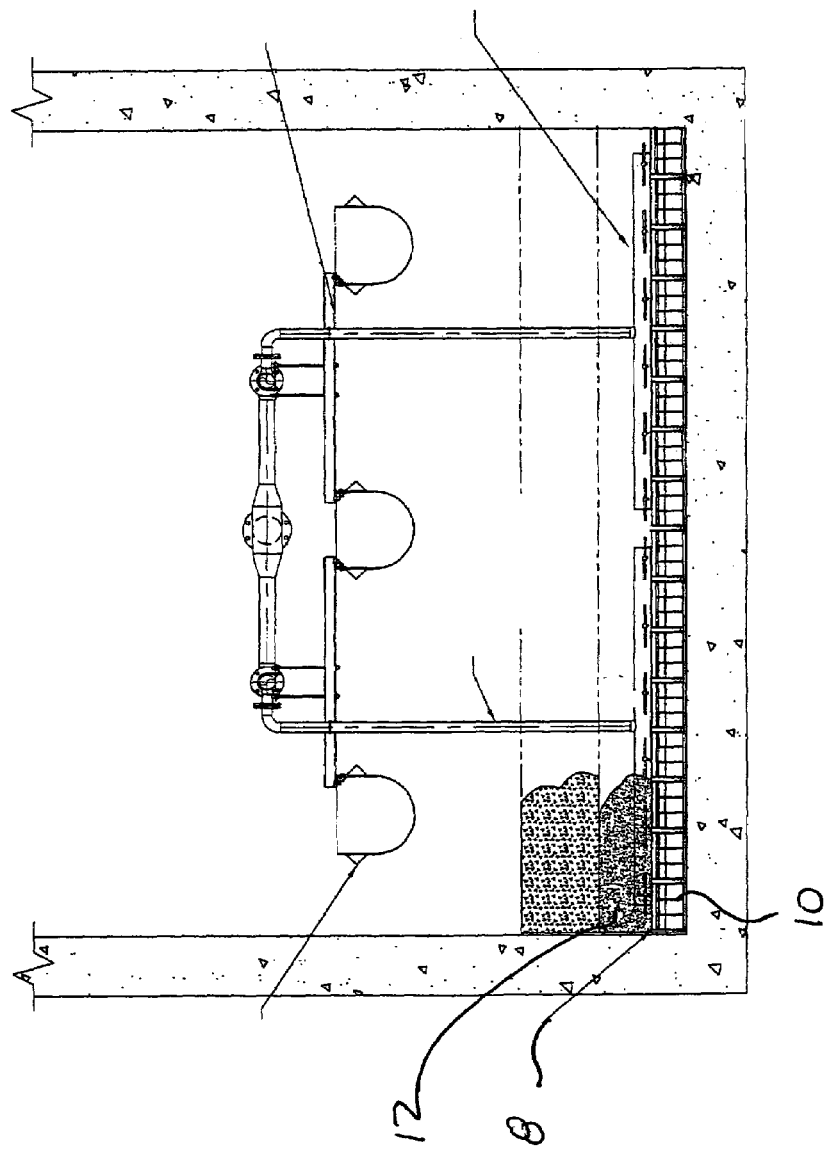
FIG. 2 illustrates a prior art filter using a porous plate between the layer of filter sand and the underdrain blocks.
Figure 3:
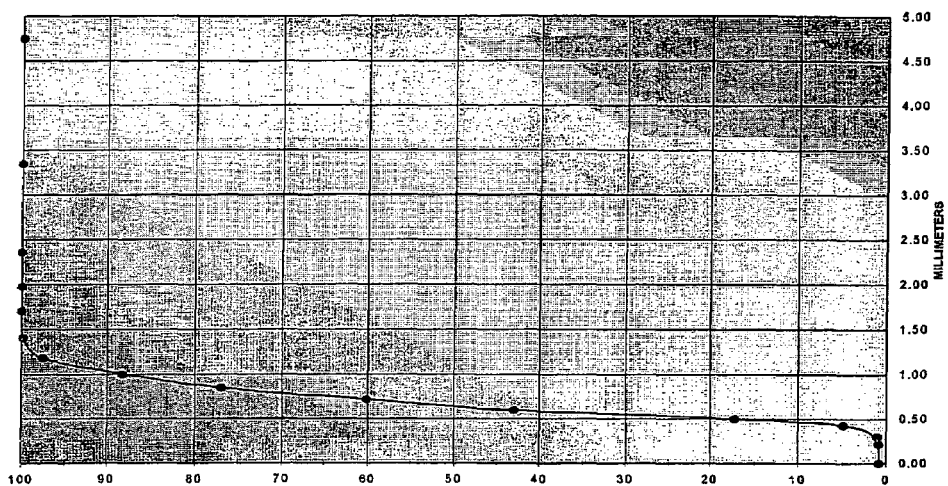
FIG. 3 illustrates a typical sieve analysis curve for sand filter media used in a polishing filter.
Figure 4:
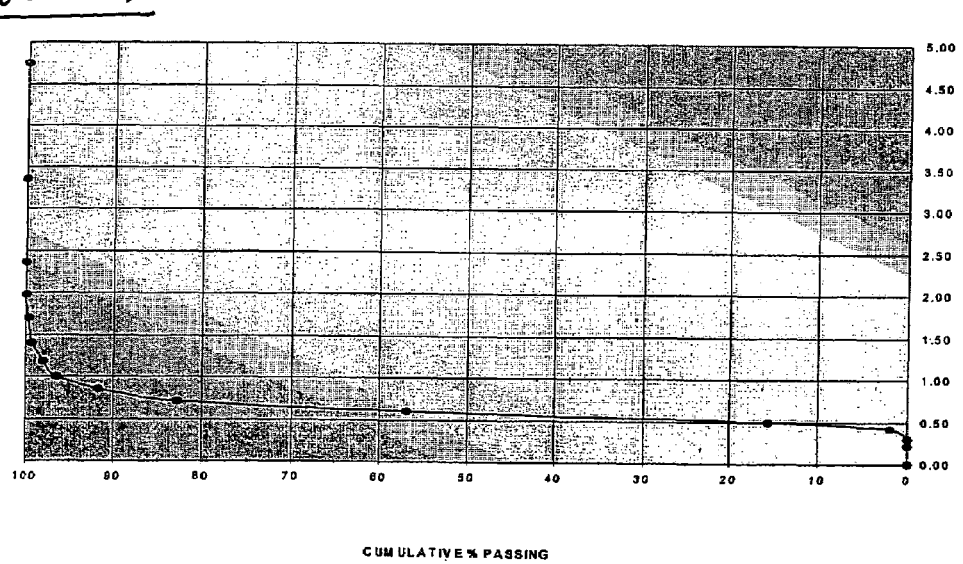
FIG. 4 illustrates a sieve analysis curve for filter media having an effective size within the range of 0.45 mm to 0.55 mm and a uniformity coefficient of less than 1.35.
Figure 5:
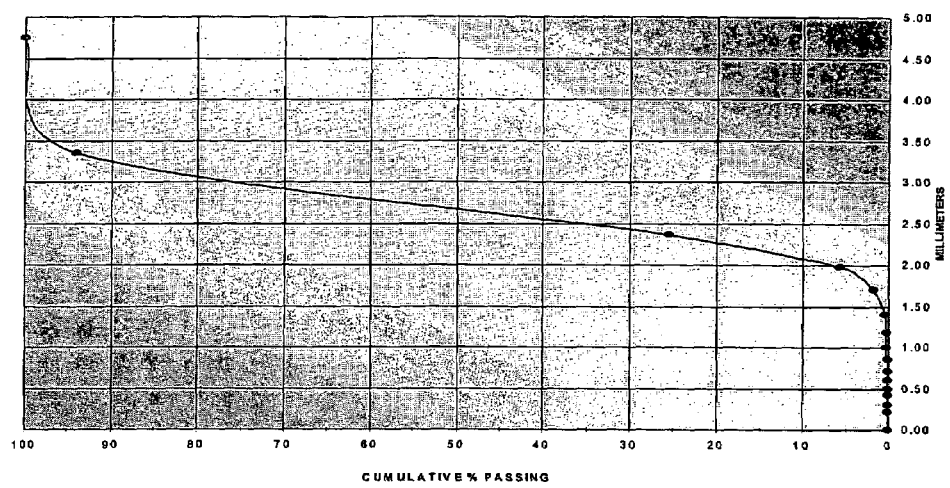
FIG. 5 illustrates a sieve analysis curve for coarse sand filter media having an effective size within the range of 2.00 mm to 3.00 mm and a uniformity coefficient of less than 1.7.

FIG. 3 illustrates a typical sieve analysis curve for filter sand used in a polishing filter. The effective size of this filter sand falls in the range of 0.45 mm to 0.55 mm. The uniformity coefficient of this filter sand is less than 1.7. Prior filter layers satisfying this filter media specification required one or more gravel support layers to prevent clogging and/or structural failure of the underdrain. Alternatively, a porous plate has used in place of the gravel support layers to prevent clogging and/or structural failure of the underdrain. Where porous plates are used, the finer particles of the filter sand embed in the pores of the porous plate unless an additional layer of torpedo sand is used.

Figure 6:
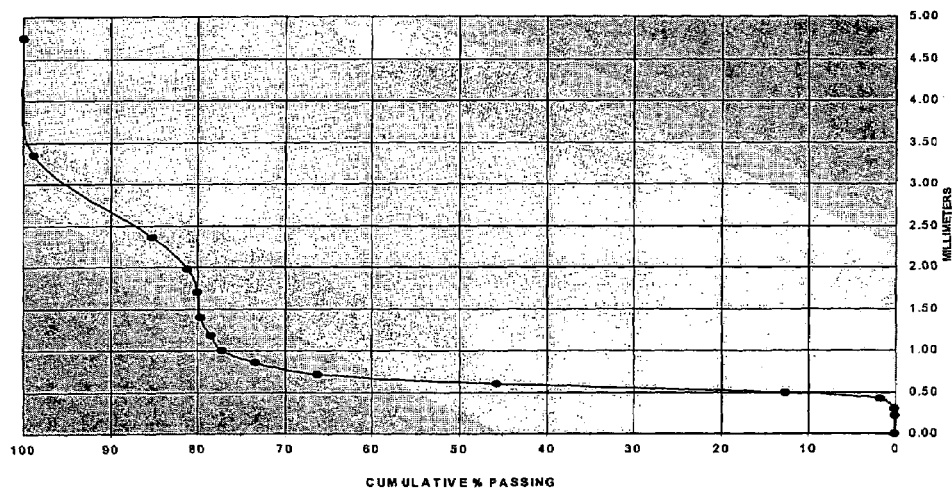
FIG. 6 illustrates a sieve analysis curve for a blended media formed from four parts of the filter media having a sieve analysis curve as illustrated in FIG. 4 with one part of coarse sand having a sieve analysis curve as illustrated in FIG. 5.

One aspect of the present invention is to provide a filter layer (satisfying in all respects the specifications of filter sand used in a polishing filter) the lower portion of which forms a protective barrier to prevent clogging or structural failure of the underdrain. A filter layer in accordance with a preferred embodiment of the present invention is formed by blending filter sand satisfying the sieve analysis curve of FIG. 4 with coarse sand satisfying the sieve analysis curve of FIG. 5. Most preferably, four parts of filter sand satisfying the sieve analysis curve illustrated in FIG. 4 (i.e., having an effective size within the range of 0.45 mm to 0.55 mm and a uniformity coefficient less than 1.35) is mixed with one part of coarse sand satisfying the sieve analysis curve of FIG. 5 (i.e., having an effective size in the range of 2.0 mm to 3.0 mm and a uniformity coefficient of less than 1.7) The resultant blended media filter layer has a sieve analysis curve as illustrated in FIG. 6. The blended filter layer has an effective size in the range of 0.45 mm to 0.55 mm and a uniformity coefficient less than 1.7. Accordingly, the blended media filter layer satisfies in all respects the sieve analysis curve of typical filter media specifications illustrated in FIG. 3. The uniformity coefficient of the filter sand is selected to be low enough such that when combined with the coarse sand, the blended media still satisfies the desired uniformity coefficient for the filter layer. It should be noted that the effective size of this mixture of coarse sand and filter sand does not differ from the effective size of the filter sand. Further, the uniformity coefficient of this mixture differs only slightly from the uniformity coefficient of the filter sand.

The resultant blended media filter layer differs greatly from typical filter layers for a polishing filter in that the larger particles making up a part of the blended media filter layer (i.e., the coarse sand having an effective size in the range of 2.0 mm to 3.0 mm) will form a protective barrier in the lower portion of the filter layer thereby avoiding the need for either additional layers of support gravel or torpedo sand in the filter. It will be readily appreciated that the above passages describes a preferred manner of forming a filter layer in accordance with the present invention. The type of media as well as the particular effective size and the uniformity coefficient of the media forming the filter layer may be varied as desired. In addition, the proportions of media used to form the filter layer may be varied as well.

The preferred manner of forming the protective barrier will now be described. After the lot of filter media is obtained to form the filter layer, the lot of filter media is installed in the polishing filter A (only a portion of which is shown) to form a filter layer 14 directly above the porous plates 16 resting on top of and secured to the underdrain blocks 20. Subsequently, a fluid (preferably water) is directly upwardly at a sufficiently high rate to fluidize the filter layer 14. The fluidization step is performed relative to the minimum fluidization velocity $v_{mf}$, which is determined by the following equation: $v_{mf} = 0.00381 (d_{60\%})^{1.82} (sg-1)^{0.941} \rho^{1.88} \mu^{-0.88}$ where "$d_{60\%}$" is the 60% size of the media particles in millimeters (equal to the product of the uniformity coefficient (UC) of the particles and the effective size of the particles (ES); "sg" is the specific gravity of the particles; "$\rho$" is the density of the liquid in lbs./cu.ft.; and "$\mu$" is the viscosity of the liquid in centipoises. If the Reynolds number based on $d_{60\%}$ and $v_{mf}$ is greater than 10, then the following multiplying factor must be applied:

$$K_{mf} = 1.775 Re_{mf} - 0.272$$

where $Re_{mf}$ is the Reynolds number based on $d_{60\%}$ and $v_{mf}$. Specifically, filter layer 14 is fluidized by directing an upward flow of fluid at a velocity in excess of the minimum fluidization velocity. This causes the filter layer 14 to expand and fluidize. If the flow of fluid is reduced gradually, the various sizes of media in the filter layer 14 will settle out at difference rates with the coarser media settling directly above the porous plates to form a protective barrier.

The coarse size media is selected based on its fluidization characteristics relative to the fine media size so that after the filter layer is fluidized and the flow rate of the fluid is reduced in a controlled manner, the coarse media will settle directly above the porous plate forming the protective barrier. The filter layer 14 may be fluidized prior to installation of any additional filter layers such as anthracite filter layer 22. Alternatively, the fluidization step can take place after the filter bed is fully formed or even after the filter has been placed in service.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A method of forming a gravel-less polishing filter for filtering water and/or wastewater, said method comprising the steps of:

(a) determining at least two parameters for a layer of filter media to be installed directly above a gravel-less underdrain in a polishing filter wherein one of the at least two parameters is an effective size less than 1 mm and the other of the at least two parameters is a uniformity coefficient less than 2;

(b) providing a first lot of filter media satisfying said at least two parameters for the layer of filter media to be installed directly above a gravel-less underdrain;

(c) providing a second lot of media that does not satisfy at least one of said at least two parameters for the layer of filter media to be installed directly above a gravel-less underdrain; and, (d) blending at least a portion of said first lot of filter media with at least a portion of said second lot of media to form a third lot of media that satisfies both of said at least two parameters for the layer of filter media to be installed directly above a gravel-less underdrain, said third lot of media having a composition such that when installed in a filter at least a portion of the larger particles settle directly on top of the gravel-less underdrain thereby forming a protective barrier preventing smaller particles from clogging the gravel-less underdrain.

2. A method as recited in claim 1, including the further step of:

(a) after said blending step in claim 1, testing said third lot of media to verify that said third lot of media satisfies said at least two parameters for a layer of filter media to be installed directly above a gravel-less underdrain.

3. A method as recited in claim 1, including the further steps of:

(a) providing a polishing filter having a gravel-less underdrain;

(b) after said blending step in claim 1, installing said third lot of media in the polishing filter directly above the gravel-less underdrain to form a filter layer.

4. A method as recited in claim 3, including the further steps of:

(a) after the step of installing the third lot of media to form a filter layer, directing a fluid through the filter layer; and, (b) controlling the flow of fluid through the filter layer such that at least a portion of the larger particles in the filter layer settle directly adjacent the gravel-less underdrain to prevent the smaller particles of the filter layer from clogging the gravel-less underdrain.

5. A method as recited in claim 1, wherein:

(a) the at least two parameters include an effective size ranging from 0.40 mm to 0.60 mm and a uniformity coefficient less than or equal to 1.8.

6. A method as recited in claim 5, wherein:

(a) said first lot of media has an effective size within the range of 0.40 mm to 0.60 mm and a uniformity coefficient equal to or less than 1.5.

7. A method as recited in claim 6, wherein:

(a) said second lot of media has an effective size ranging from approximately 2.0 mm to approximately 3.0 mm.

8. A method as recited in claim 1, wherein:

(a) said blending step is performed such that at least two-thirds of the third lot of media is formed from the first lot of filter media.

9. A method as recited in claim 1, wherein:

(a) said blending step is performed such that a major portion of the third lot of media is formed from the first lot of filter media.

10. A method as recited in claim 1, wherein:

(a) said blending step is performed such that at least approximately four-fifths of the third lot of media is formed from the first lot of filter media.

11. A method of forming a filter layer for a gravel-less polishing filter for filtering water and/or wastewater, said method comprising the steps of:

(a) determining at least two parameters for a layer of filter media to be installed directly above a gravel-less underdrain in a polishing filter wherein one of the at least two parameters is an effective size less than 1 mm and the other of the at least two parameters is a uniformity coefficient less than 2;

(b) providing a first lot of filter media satisfying said at least two parameters for the layer of filter media to be installed directly above a gravel-less underdrain;

(c) providing a second lot of media that has an effective size at least twice as large as an effective size of said first lot of filter media; and, (d) blending at least a portion of said first lot of filter media with at least a portion of said second lot of media to form a third lot of media that satisfies both said at least two parameters for the layer of filter media to be installed directly above a gravel-less underdrain, said third lot of media having a composition such that when installed in a filter at least a portion of the larger particles settle directly on top of the gravel-less underdrain thereby forming a protective barrier preventing smaller particles from clogging the gravel-less underdrain.

12. A method as recited in claim 11, wherein:

(a) the effective size of said second lot of media is greater than or equal to 2.0 mm.

13. A method as recited in claim 12, wherein:

(a) the effective size of the first lot of filter media is less than 0.6 mm; and, (b) the uniformity coefficient of the first lot of filter media is equal to or less than 1.5.

14. A method as recited in claim 12, wherein:

(a) the effective size of the first lot of filter media is in the range of approximately 0.45 mm to approximately 0.55 mm; and, (b) the uniformity coefficient of the first lot of filter media is less than 1.35.

15. A method as recited in claim 11, wherein:

(a) said blending step is performed such that at least two-thirds of the third lot of media is formed from the first lot of filter media.

16. A method as recited in claim 11, wherein:

(a) said blending step is performed such that a major portion of the third lot of media is formed from the first lot of filter media.

17. A method as recited in claim 12, wherein:

(a) said blending step is performed such that at least four-fifths of the third lot of media is formed from the first lot of filter media.

18. A method of forming a gravel-less polishing filter for filtering water and/or wastewater, said method comprising the steps of:

(a) determining at least two parameters for a layer of filter media to be installed directly above a gravel-less underdrain in a polishing filter wherein one of the at least two parameters is an effective size less than 1 mm and the other of the at least two parameters is a uniformity coefficient less than 2;

(b) providing a first lot of filter media satisfing said at least two parameters for the layer of filter media to be installed directly above a gravel-less underdrain;

(c) providing a second lot of media that has an effective size at least twice as large as the effective size of said first lot of filter media; and, (d) blending at least a portion of said first lot of filter media with at least a portion of said second lot of media to form a third lot of media that satisfies both said at least two parameters for the layer of filter media to be installed directly above a gravel-less underdrain;

(e) providing a polishing filter having a gravel-less underdrain including a porous plate;

(f) after said blending step, installing said third lot of media in the polishing filter directly above the porous plate to form a filter layer.

19. A method as recited in claim 18, including the further steps of:
(a) after the step of installing the third lot of media to form a filter layer, directing a fluid through the filter layer; and,
(b) controlling the flow of fluid through the filter layer such that at least a portion of the larger particles in the filter layer settle directly on top of the porous plate thereby forming a protective barrier preventing smaller particles of the filter layer from clogging the porous plate.

20. A method as recited in claim 19, wherein:
(a) said first lot of filter media has an effective size ranging from approximately 0.45 mm to approximately 0.55 mm and a uniformity coefficient less than 1.5;
(b) said second lot of media has an effective size ranging from approximately 2.0 mm to approximately 3.0 mm and a uniformity coefficient less than 1.7 mm; and,
(c) said blending step is performed such that approximately four-fifths of said third lot of media is formed from said first lot of filter media.

21. A method of forming a gravel-less polishing filter for filtering water and/or wastewater, said method comprising the steps of:
(a) providing a polishing filter having a gravel-less underdrain including a porous plate, the porous plate having a plurality of openings;
(b) providing a lot of filter media having an effective size less than 0.75 mm and a uniformity coefficient less than 2, said lot of filter media having a sufficient number of large particles to form a protective barrier to prevent clogging of said openings of said porous plate;
(c) installing said lot of filter media in the polishing filter directly above the porous plate to form a filter layer;
(d) after the step of installing, directing a fluid through the filter layer; and,
(e) controlling the flow of fluid through the filter layer such that at least a portion of the larger particles in the filter layer settle directly on top of the porous plate thereby forming a protective barrier preventing smaller particles from clogging said porous plate.

\* \* \* \* \*